United States Patent [19]

Inagaki

[11] Patent Number: 4,827,982

[45] Date of Patent: May 9, 1989

[54] DETENT MECHANISM FOR PRESSURE CONTROL VALVE

[75] Inventor: Ikuo Inagaki, Saitama, Japan

[73] Assignee: Kayaba Industry Co., Ltd., Japan

[21] Appl. No.: 134,178

[22] Filed: Dec. 17, 1987

[30] Foreign Application Priority Data

Dec. 22, 1986 [JP] Japan .................. 61-197014[U]

[51] Int. Cl.$^4$ .............................................. F15B 13/02
[52] U.S. Cl. ...................... 137/636.1; 137/596; 251/65; 251/297
[58] Field of Search ............ 137/596, 636.1; 251/65, 251/297

[56] References Cited

U.S. PATENT DOCUMENTS

| | | | |
|---|---|---|---|
| 2,958,233 | 11/1960 | Johnson | 251/297 X |
| 3,490,495 | 1/1970 | Green | 137/636.1 |
| 4,342,335 | 8/1982 | Reinicker et al. | 137/596 X |
| 4,530,376 | 7/1985 | Chatterjea | 137/636.1 |
| 4,777,981 | 10/1988 | Petro | 137/596 X |

FOREIGN PATENT DOCUMENTS 1345091 10/1963 France .................. 251/297

*Primary Examiner*—Gerald A. Michalsky
*Attorney, Agent, or Firm*—Steinberg & Raskin

[57] ABSTRACT

A detent mechanism for a pressure control valve adapted to control the extent of deflection of each of pressure control springs to control pressure on a secondary side of each of spools to a level depending on the deflection, which is capable of causing each of solenoids to be simplified or small-sized. For this purpose, the control lever is provided with a plurality of suction elements and the solenoids are arranged to suck suction elements thereon. A position at which each of the suction elements is sucked on the solenoid is defined outside of a position at which push rods each are abutted against a forcing section of the control rod.

8 Claims, 2 Drawing Sheets

DETENT MECHANISM FOR PRESSURE CONTROL VALVE

BACKGROUND OF THE INVENTION

This invention relates to a detent mechanism for a pressure control valve, and more particularly to a detent mechanism for a pressure control valve wherein a control lever is provided with pressing sections and also provided at a portion thereof below each of the pressing sections with a push rod, so that pivotal movement of the control lever may cause each of the pressing sections to force or push the push rod. The amount or extent of movement of each of spools may be determined depending on the amount or extent of forcing of the pressing section or the amount or extent of pivotal movement of the control lever, resulting in pressure on a secondary side which acts on the spool being controlled.

A conventional detent mechanism for a pressure control valve of such type which has been extensively used in the art is typically disclosed in Japanese Patent Application Laying-Open Publication No. 101175/1982, the disclosure of which is incorporated by reference. The conventional detent mechanism is constructed in such a manner as shown in FIG. 1. More particularly, it includes a control lever 1 which is provided with at least a pair of forcing sections 2 and 3. The forcing sections 2 and 3 are abutted against one end of rods 4 and 5 formed of a nonmagnetic material, respectively. The following description will be made in connection with the rod 4 because both rods are constructed in substantially the same manner.

The rod 4 is arranged in a manner to be inserted through a solenoid 6 and has a magnetic cap 7 fixed at the other end or a distal end thereof. The detent mechanism also includes a push rod 8 which is abutted at a distal end thereof against each of the magnetic caps 7 and provided with a guide member 9. Between the magnetic cap 7 and the guide member 9 of the push rod 8 is interposed a spring 10. Below the guide member 9 is arranged a spool (not shown), on which a pressure control spring acts. The pressure control spring is adapted to exhibit elastic force controlled depending on the extent of operation of the control lever 1.

When the control lever 1 is pivotally moved in a clockwise direction in FIG. 1, the rod 5 is pushed down by the forcing section 3 of the lever 1 and the rod 4 and magnetic cap 7 are raised by the action of the spring 10.

When the rod 5 is pushed down as described above, the spool positioned below the rod 5 is changed over and the force of the pressure control spring is controlled depending on the amount or extent of changing-over of the spool or the extent of operation of the control lever 1.

When the force of the pressure control spring is thus controlled, the controlled force causes the spool to be actuated to keep pressure on a secondary side thereof below a predetermined value.

When the control lever 1 is inclined to a maximum extent in the clockwise direction, the magnetic cap 7 is sucked on the solenoid 6, the spool as well as the control lever 1 is held at its changing-over position to keep force on the secondary side at a pressure value predetermined depending on the force of the pressure control spring.

Thus, such a conventional detent mechanism as described above is so constructed that the solenoid 6 is provided on an axis of the push rod 8. Such construction causes the additional rods 4 and 5 to be required to force the push rod 8 and the solenoids and rods to be received in a casing C, resulting in a structure of the detent mechanism and therefore the pressure control valve being highly complicated.

Also, arrangement of the solenoid 6 through the rod 4 fails to provide lubrication sufficient to carry out smooth sliding between the solenoid 6 and the rod 4, resulting in galling.

Further, holding of the magnetic cap 7 on the solenoid 6 by suction causes the directions of hydraulic reaction force and suction force to be opposite to each other. Accordingly, in order to keep the magnetic cap 7 on the solenoid 6 by suction, it is required to cause the suction force to be larger than the hydraulic reaction force. This causes the solenoid 6 to be large-sized, to thereby lead to further complication of the structure.

SUMMARY OF THE INVENTION

The present invention has been made in view of the foregoing disadvantages of the prior art.

Accordingly, it is an object of the present invention to provide a detent mechanism for a pressure control valve which is capable of being highly simplified in its structure.

It is another object of the present invention to provide a detent mechanism for a pressure control valve which is capable of being significantly small-sized.

It is a further object of the present invention to provide a detent mechanism for a pressure control valve which is capable of eliminating rods other than a push rod and using a small-sized solenoid or a solenoid of small suction force.

In accordance with the present invention, a detent mechanism for a pressure control valve is provided. The detent mechanism includes a control lever provided with forcing sections and pivotally moved. To each of the forcing sections of the control lever is operatively connected a push rod which is forced by the forcing section. The detent mechanism also includes a pressure control spring operatively engaged with each of the push rods and adapted to be deflected when the corresponding forcing section forces the push rod and a spool operatively connected to each of the push rods so as to be changed over by means of force of the pressure control spring due to its deflection to control pressure on a secondary side thereof depending on the extent of operation of the control level.

Further, the detent mechanism includes a suction element which is arranged on the control lever at a position outside of each of the forcing sections abutted against the corresponding push rod and suction means for selectively holding each of the suction elements thereon by suction when the control lever is pivotally moved.

In a preferred embodiment of the present invention, the suction means each comprise a solenoid.

The detent mechanism of the present invention constructed as described above eliminates a necessity of providing the solenoid on an axis of the push rod. This permits the push rod to be directly abutted against the forcing section of the control lever.

Also, a position at which hydraulic reaction force acts on the forcing section of the control rod through the push rod is inside of a position at which the suction element is held on the solenoid by suction, so that a solenoid which exhibit small suction force may be used as the suction means in the present invention.

Thus, the present invention permits elimination of any rods other than the push rods and simplifies its structure.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
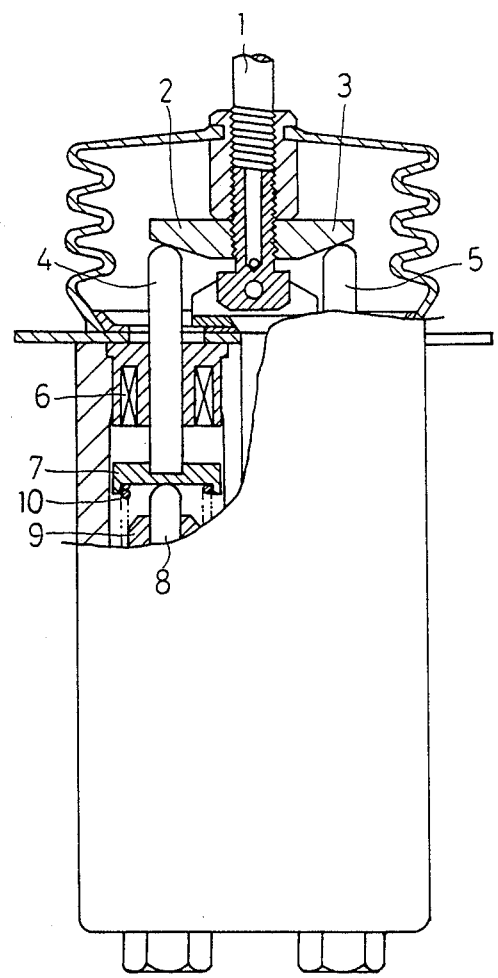
FIG. 1 is a front elevation view partly in section showing a conventional detent mechanism for a pressure control valve.
Figure 2:
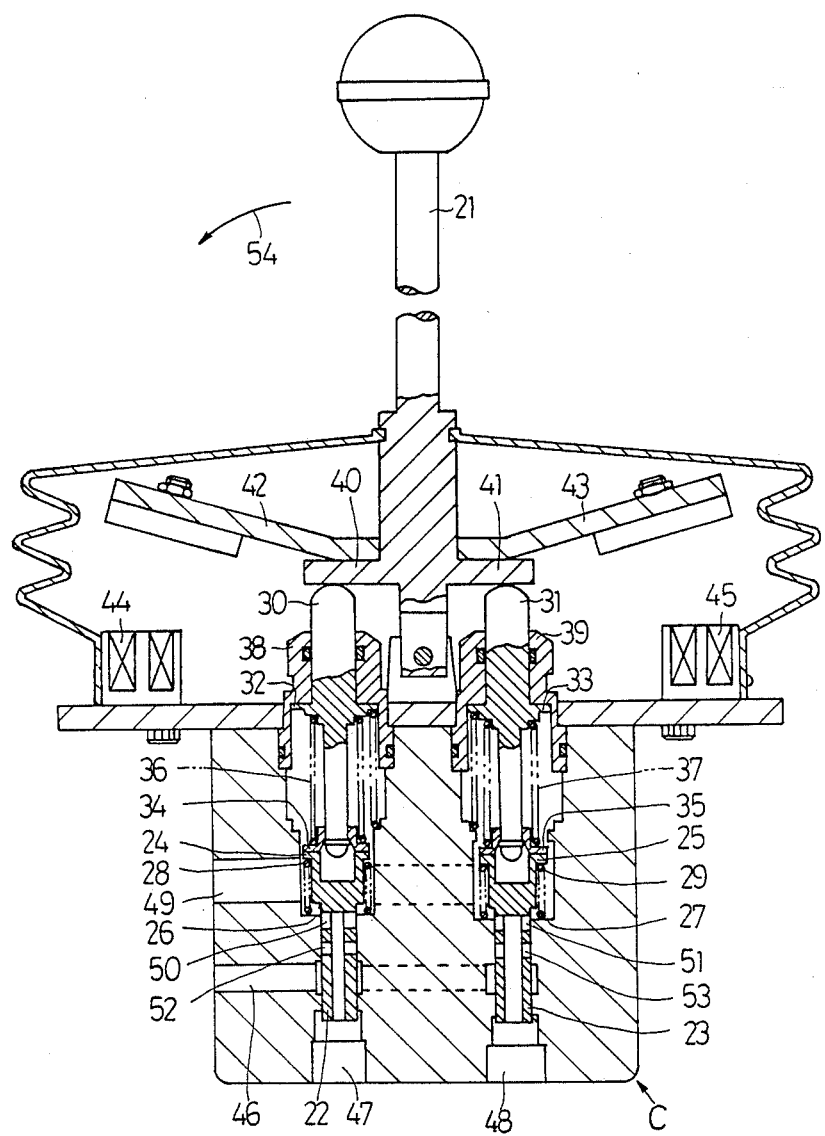
FIG. 2 is a vertical sectional view showing an embodiment of a detent mechanism for a pressure control valve according to the present invention.

Referring now to FIG. 2 illustrating an embodiment of a detent mechanism for a pressure control valve according to the present invention, a detent mechanism of the illustrated embodiment includes a casing C at which a control lever 21 is pivotally mounted and in which a plurality of spools 22 and 23 are slidably arranged. In FIG. 2, a pair of the spools are shown in FIG. 2, however, two or more pairs of the spools may be arranged. The spool 22 and 23 are formed at upper ends thereof with flanges 24 and 25, respectively, and the casing C is formed with steps 26 and 27. Between the flanges 24 and 25 and the steps 26 and 27 are interposedly arranged springs 28 and 29, respectively.

The detent mechanism of the illustrated embodiment also includes push rods 30 and 31 arranged in the casing C and provided in number corresponding to the spools. The push rods are positioned above the spools 22 and 23, respectively. The push rods 30 and 31 are formed at intermediate portions thereof with flanges 32 and 33 and provided at lower end portions thereof with spring bearings 34 and 35, with pressure control springs 36 and 37 being interposed between the flanges 32 and 33 and the spring bearings 34 and 35, respectively.

The spool 22 and 23 are adapted to be constantly contacted with the spring bearings 34 and 35 by cooperation of the springs 28 and 29 and the pressure control springs 36 and 37, respectively. The spring bearings 34 and 35 are adapted to be movable between stoppers provided at lower end portions of the push rods 30 and 31 and the flanges 32 and 33.

The push rods 30 and 31 are arranged in a manner to be upwardly projected at upper ends thereof from bearings 38 and 39. Also, the upper ends of the push rods 30 and 31 are pressedly abutted at the upper ends against forcing sections 40 and 41 provided at the control lever 21 corresponding to the push rods 30 and 31.

Further, the detent mechanism of the illustrated embodiment includes a plurality of suction elements 42 and 43 mounted on the control lever 21 at a position above the forcing sections 40 and 41, respectively. The suction elements 42 and 43 are arranged corresponding to the forcing sections 40 and 41 and formed in a manner to be outwardly projected at outer ends thereof beyond the forcing sections 40 and 41. Also, the suction elements 42 and 43 are so bent that the outer ends may obliquely upwardly extend.

The detent mechanism further includes a plurality of solenoids 44 and 45 acting as suction means and arranged on a cover plate which acts as a lid of the casing C so as to be positioned on a locus of pivotal movement of each of the suction elements 42 and 43 outside of the push rods 30 and 31.

When the control lever 21 is held at a neutral position shown in FIG. 2, communication between an inlet 46 and outlets 47 and 48 is blocked. However, the outlets 47 and 48 are communicated with a drain port 49 through first oil feed holes 50 and 51 formed at the spools 22 and 23, respectively. The spools 22 and 23 are also formed with second oil feed holes 52 and 53, respectively, which communicates with the inlet 46 when the spool 22 and 23 are downwardly moved.

When the control lever 21 is pivotally moved in a direction indicated at an arrow 54 or a counterclockwise direction in FIG. 2, the push rod 30 is pushed down to lower the spool 22 while compressing the pressure control spring 36. Such lowering of the spool 22 causes communication between the first oil feed hole 50 and the drain port 49 to be blocked and the second oil feed hole 52 to communicate with the inlet 46 and to communicate the inlet 46 with the outlet 47, resulting in pressure oil being discharged through the outlet 47.

At this time, when pressure on a secondary side of the outlet 47 in increased above a predetermined pressure value which is determined depending on the amount or extent of deflection of the pressure control spring 36, it causes the spool 22 to be pushed up against the pressure control spring 36. This results in communication between the second oil feed hole 52 and the inlet 46 being blocked and the first oil feed hole 50 communicating with the drain port 49 to keep the pressure on the secondary side within the predetermined pressure value. More specifically, the spool 22 is vertically moved so as to accomplish balance between force of the pressure control spring 36 and the pressure on the secondary side of the outlet 47, to thereby maintain the pressure on the secondary side within the predetermined value.

When the control lever 21 is pivotally moved to a maximum extent in the counterclockwise direction, the suction element 42 is held on the solenoid 44 by suction to keep the pressure on the secondary side at a maximum value.

While the suction element 42 is held on the solenoid 44 by suction, the pressure on the secondary side of the outlet 47 exerted on the spool 22 generates force which acts to release the suction element 42 and solenoid 44 from each other. The force acts on the forcing section 40 of the control lever 21 through the push rod 30. However, a position at which the force acts on the forcing section 40 is inside of a position at which the suction element 42 is sucked on the solenoid 44. Such construction permits a solenoid exhibiting small suction force to be sufficiently used for the solenoid 44. This is also applicable to the solenoid 45. This results in the solenoids 44 and 45 being small-sized.

Pivotal movement of the control lever 21 in a direction opposite to that of the arrow 54 actuates the other push rod 31 in substantially the same manner as described above.

In the illustrated embodiment, the forcing sections 40 and 41 of the control lever 21 are formed separate from the suction elements 42 and 43. However, they may be integrally formed together.

While a preferred embodiment of the present invention has been described with a certain degree of particularity with reference to the drawings, modifications and variations are possible in the light of the above teachings. It is therefore to be understood that within the scope thereof, the invention may be practiced otherwise than as specifically described.

What is claimed is:

1. A detent mechanism for a pressure control valve comprising:
   a control lever provided with a plurality of forcing sections and pivotally moved;
   a plurality of push rods, each operatively connected with a respective one of said forcing section of said control lever, each said push rod being forced by said respective forcing section;
   a plurality of pressure control springs, each operatively engaged with a respective one of said push rods, each said pressure control spring being deflected when said respective forcing section forces said respective push rod;
   a plurality of spools, each operatively connected to a respective one of said push rods so as to be changed over by means of force of said respective pressure control spring due to its deflection to control pressure on a secondary side thereof depending on the extent of operation of said control lever;
   a plurality of suction elements, each arranged on said control lever at a position outside of said forcing sections abutting against said push rods and provided in number corresponding to said forcing sections of said control lever; and
   suction means for selectively holding a respective on of said suction elements thereon by suction when said control lever is pivotally moved;
   wherein said suction elements each are positioned on a locus of pivotal movement larger than that of said forcing sections of said control lever; and
   said suction means are arranged within said locus of pivotal movement of said suction elements and out of said forcing section locus of movement.

2. The combination of claim 1, wherein said suction means comprise a plurality of solenoids.

3. The combination of claim 1, wherein said suction elements are bent with outer ends thereof extending obliquely upwardly and away from said forcing sections.

4. The combination of claim 1, wherein reaction force acting on said respective forcing sections is inside of a position at which said respective suction element is retained by said suction means.

5. The combination of claim 1, wherein said suction elements are located on said lever on a side of said forcing sections opposite said push rods, and
   said suction means are positioned in the valve on an opposite side of said forcing sections.

6. The combination of claim 5, wherein said suction means and push rods are positioned at substantially the same level.

7. The combination of claim 1, additionally comprising
   a plurality of bearings, a respective one of said push rods seated, with each said push rod pressingly abutting said respective forcing section at an upper end thereof,
   said push rods each comprising a flange at a lower end thereof on which an end of said respective pressure spring is seated,
   a plurality of spring bearings, an opposite end of a respective one of said pressure springs seated in a respective spring bearing,
   each said spool comprising a flange at an upper end thereof,
   a casing of the valve being provided with steps, and
   an intermediate spring being situated between each said spool flange and casing step for urging each said spool into contact with a respective spring bearing.

8. The combination of claim 7, wherein each said spool is provided with first and second feed holes, and
   said casing is provided with an inlet port, and outlet port, and a drain port, which communicate with one another through said respective spool holes depending upon position of said spool in said casing, such that
   when said control lever is held in a neutral position, said outlet and drain ports communicate through said first feed hole,
   wherein said control lever is downwardly biased by said lever against the force of a respective compression spring, said inlet and outlet ports communicate through said second feed hole, and communication between said first feed hole and drain port is blocked, and
   when pressure is said outlet port increases beyond a predetermined value, said respective spool raises against pressure of said respective pressure spring so that said first feed hole communicates with said drain port, and communication between said second feed hole and said inlet port is blocked, whereby said predetermined pressure value is maintained.

* * * * *